Clifford E. Anderson
Ronald A. Gulick
INVENTORS

ATTORNEY

United States Patent Office 3,174,495
Patented Mar. 23, 1965

3,174,495
FIRE SAFE BALL VALVE
Clifford E. Anderson and Ronald A. Gulick, Houston, Tex., assignors to ACF Industries, Incorporated, New York, N.Y., a corporation of New Jersey
Filed Nov. 16, 1962, Ser. No. 238,840
13 Claims. (Cl. 137—74)

This invention relates to spherical plug valves, commonly referred to in the industry as ball valves, and more particularly to a fire-safe ball valve, and is a continuation-in-part of our copending application Serial No. 87,148 filed February 6, 1961 now abandoned in favor of the present application.

Ball valves themselves are quite old and are rather simple in construction being comprised of a valve body having a central valve chamber, a spherical valve member positioned in the valve chamber, and one or two seat members. The valve member has a passage therethrough which in the open position of the valve registers with the inlet and outlet ports in the body, and a stem which projects through the body and provides means to rotate the ball 90° between open and closed positions. Seats for ball valves have been generally formed of various plastic materials. Originally, rubber was used, but with the development of the fluorocarbons, such material has more or less replaced rubber. Various of the ball valves have been of the top entry type, that is, having an open top valve chamber through which the ball and seats are inserted.

Since many ladings carried by valves are highly flammable, it is highly desirable that in the event of fire a valve is not a fire feeder. Since the various soft seats normally used in ball valves will disintegrate during a fire, provision of secondary metal-to-metal seats would be advantageous. It is the primary object of the present invention to provide such secondary metal-to-metal seats upon disintegration of the primary soft seats.

It is still another object to provide a top entry trunnioned ball valve having a sealing element utilizing a resilient seat member with a fusible trunnion bearing to permit the valve member to contact the metal portion of the sealing element in case of temperature in excess of that of the resilient seat member.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein.

Figure 1:
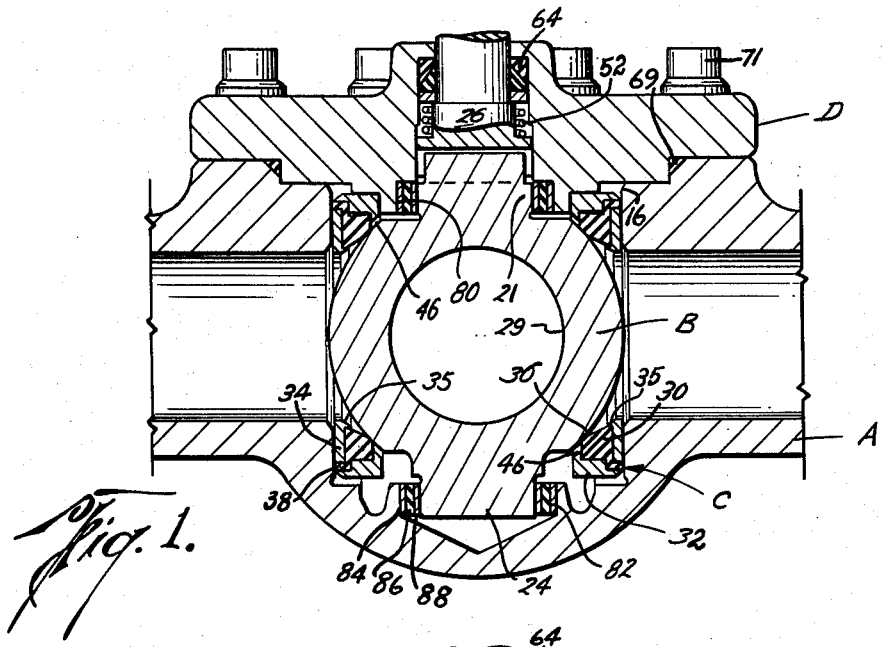
FIG. 1 is a central vertical section through a valve of the present invention, the valve being shown in the closed position.

Referring now to FIG. 1, the valve is comprised generally of a valve body A, a spherical valve member B, two sealing elements C—C and a bonnet D.

The valve body A has two axially aligned fluid passages 10 and 12 forming inlet and outlet ports respectively. Interposed between the two passages 10 and 12 is an open top valve chamber 14. The chamber 14 has parallel flat inner walls 16—16 surrounding the passages 10 and 12 and a generally hemispherically shaped bottom wall 18 having a centrally located boss member 20. The boss member 20 has an aperture 22 therein.

The spherical valve member B is positioned in the valve chamber 14. The valve member B has two stems 24 and 26. The stem 24 is trunnioned in the aperture 22 of the boss member 20. A fusible assembly 82 is interposed between the stem 24 and the aperture 22. The other stem 26 extends out past the top of the open-ended valve chamber 14 and is trunnioned in the bonnet D and functions as the operating stem. The stem 26 may be integral, or as shown in the drawings the stem 26 may be a separate piece attached to the valve member B by a tongue and groove connection which prevents floating in closed position. With such construction the top of the ball may be formed with a turned portion 21 which is trunnioned in an aperture 80 in the bonnet D. As with the lower stem 24, a fusible assembly 82 may be interposed between the wall of aperture 80 and turned portion 21 of the stem 26. By trunnioning the valve member B, it will not float as a result of the force applied by upstream line pressure when the valve is closed thereby eliminating the high bearing loads on the downstream sealing element resulting from a floating ball. Also, it permits sealing elements C—C to function as pressure actuated seals both upstream and downstream. As the size of the valve decreases, it may be more preferable to cantilever the valve member B rather than trunnion it both top and bottom. The spherical valve member B has a passage 29 therethrough which in the open position is aligned with the passages 10 and 12 to form the run of the valve. As is customary in ball valves, the spherical valve member is rotatable 90° between open and closed positions.

The sealing elements C—C are positioned between the valve member B and the flat end walls 16—16 of the valve chamber 14. Each sealing element C is formed of a seat member 30, an annular retainer ring 32 and a flat annular restraining washer 34 having an axially extending lip 35 surrounding its inner circumference. The seat member 30 is formed of resilient material. By resilient material it is meant a material having the following qualifications: impervious to inner leakage; flexible enough to conform to the spherical surface of the valve member; sufficiently flexible to move with the pressure for which it is designed so that an upstream and downstream pressure actuated seal can be effected; resistant to fluids likely to be carried by the valve; sufficient internal strength to resist excessive distortion and to resist being blown out during operation; low coefficient of friction to permit easy operation; stable characteristics over wide temperature range; fair degree of resiliency; easy to handle and simple to use; economically available. While these requirements may at first appear rigorous, it has been found that one of the fluorocarbon plastics, i.e., polytetrafluoroethylene sold by DuPont under the trademark "Teflon," satisfactorily fulfills the above requirements and provides a usable material for the seat member 30. Depending upon the size, lading to be carried and pressure rating, the seat member 30 may be formed of other materials including other fluorocarbon plastics, nylon, other plastics, hard rubber, etc. Each seat member 30 has a face mass 36 which forms a seal with the spherical surface of the valve member B and a rear mass 38 radially and axially spaced from the face mass 36, which forms a seal against the inner wall 16 of the chamber 14. The face mass 36 is compressed between the spherical surface of the valve member B and the restraining ring 34 which is arrested by the end wall 16. The rear mass 38 is compressed between the retainer ring 32 and end wall 16.

The annular retainer ring 32 gives full circumferential support to the seat member 30 and thereby limits radial expansion of the seat member. It also provides a pocket for the seat member 30 facilitating top entry. The retainer ring 32 has a lip portion 46 which is spaced from and projects in front of the surface of the face mass to limit the movement of the surface when the seat member 30 is subjected to pressure forces which tend to move the face mass 36 axially inward along the surface of the spherical valve member B.

The restaining washer 34 is a flat annular ring which is positioned between the axial outer face of the face mass 36 and the end wall 16. The inner circumference of the restraining washer 34 is provided with an axially extending lip 35 slightly radially outward of the tapering surface of the face mass 36.

The bonnet D is provided with a bore 52 through which the operating stem 26 extends. To effect a seal between the stem 26 and bore 52, the stem 26 is provided with a narrower portion and a shoulder. The bore 52 is also provided with a shoulder and narrower portion. Packing 64 consisting of two generally triangular shaped Teflon rings and a metal ring and spring is located in the bore 52. Other types of stem seals well known in the valve art may be used. To provide a seal between the bonnet D and chamber 14, there is a gasket 69. Fasteners 71 attach the bonnet D to the body A.

Figure 2:
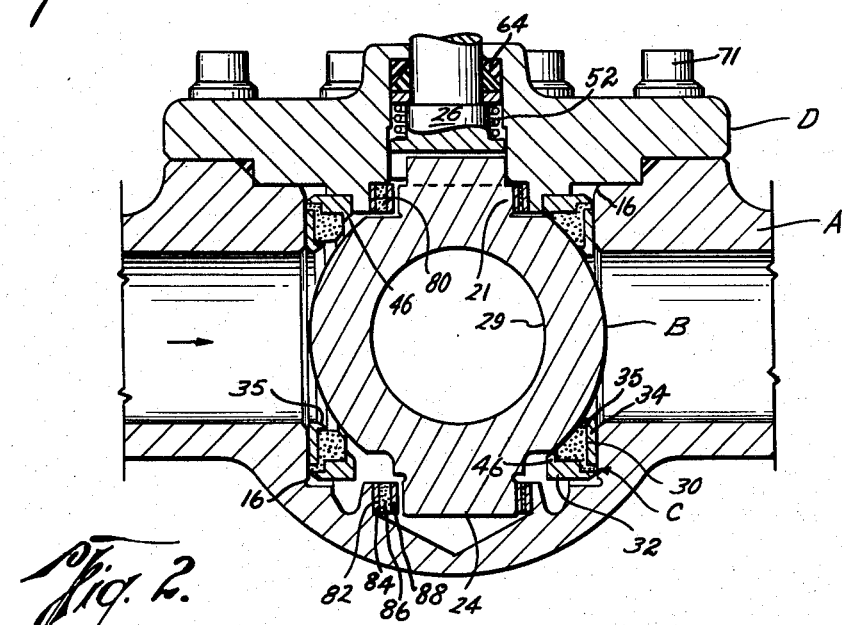
FIG. 2 is a view similar to FIG. 1 showing seating of the valve member after disintegration of the resilient seat member.

One deterrent against the use of plastic materials for valve seats is the fear that in case of fire the valve seat may disintegrate and the valve becomes a fire feeder. FIGS. 1 and 2 illustrate how in the present valve a metal-to-metal seal will be established in the event that the resilient seat 30 is disintegrated. Although the valve may not hold as tight as with the resilient seat 30, flow will be substantially retarded and the valve will not be a fire feeder. In order to provide the secondary metal-to-metal seal, provisions are made so that the valve member B may float against the retaining ring 32 and restraining washer 34 forming a metal-to-metal seal with the retaining ring 32 and restraining washer 34 which at the same time form a metal-to-metal seal with the end wall 16.

One way of permitting the necessary float of the valve member B is shown in the drawings where the fusible assembly 82 is comprised of an outer metal sleeve 84, fusible material 86 and an inner metal sleeve 88. The fusible material 86 should have no higher temperature limitations than the material forming the seat 30. Accordingly, if the valve should ever be subjected to fire or heat in excess of the temperature limitation of the material used in forming the seat 30, for a prolonged period of time and the seat 30 becomes disintegrated, the fusible material 86 of the assembly 82 will also have disintegrated. With disintegration of the fusible material 86, the upstream pressure will cause the valve member B to move downstream. The radial thickness of the fusible material 86 in the assembly 82 should be such so that upon disintegration the valve member B can move downstream an amount sufficient to make line contact with the lip 35 of the restraining washer 34 and lip 46 of the retaining ring 32, see FIG. 2. Such line contact will form a metal-to-metal seal with which while it may not be drop-tight will retard flow sufficiently so that the valve will not be a fire feeder. To permit the trunnioned valve member B to so move, the stem 26 should be separate. Moreover, the tongue and groove connection should be so designed that in the closed position the tongue is aligned with the run of the valve permitting the valve member B to be moved once the fusible material 86 of the assembly 82 has disintegrated.

In summary, the invention in general is directed to providing a ball valve, utilizing a resilient material for sealing purposes, with metal elements, such as the retaining ring 32 and restraining washer 34, with which the spherical valve member B may make metal-to-metal upon disintegration of the resilient material 30 forming the seat C, and providing means enabling the valve member when in the closed position to move, as a result of line pressure, downstream to contact such metal elements and form the secondary metal-to-metal seal. In order to accomplish this, the effective distance of protrusion of the resilient material 30 in front of the lip 46 of the retainer ring 32 and lip 35 of restraining washer 34 is no greater than the effective distance that the spherical valve member B, when in the closed position, can move downstream as a result of line pressure; therefore, enabling the spherical valve member B to make line contact with the lips 35 and 36 and form a metal-to-metal seal which will retard flow through the valve.

If the temperature limitation of the fusible material 86 in less than the temperature limitation of the resilient material 30 forming the seat, the fusible material will disintegrate prior to the disintegration of the resilient material 30 and allow the spherical valve member B to constantly remain in full contact with the seat. As the seat disintegrates and chars, the valve member B will be in contact with such charred material which will aid in holding the lading in addition to the seal obtained by the metal-to-metal contact of the valve member B with the retaining ring 32 or restraining washer 34.

As various changes may be made in the form, construction and arrangements of the parts herein without departing from the spirit and scope of the invention and wtihout sacrificing any of its advantages, it is to be understood that all matter herein is to be interpreted as illustrative and not in a limiting sense.

What we claim is:

1. A spherical plug valve comprising a valve body having two axially aligned fluid passages forming inlet and outlet ports and an open-top valve chamber interposed between said passages, the walls defining said chamber including flat end walls surrounding said passages and a bottom wall having a centrally located boss member, the boss having an aperture therein, a rotatable generally spherical valve member positioned in the valve chamber, said valve member having a passage which in the open position of the valve registers with the inlet and outlet ports to form the run of the valve and having a lower stem trunnioned in the aperture of the boss member, an assembly interposed between the aperture and lower stem having a fusible portion, the top of the valve member having a turned portion and a separate operating stem extending through the opening of the chamber, annular seat members formed of resilient material positioned between the valve member and flat end walls of the valve chamber, each seat member having a face mass provided with a valve engaging surface contacting the spherical surface of the valve member, an annular metal retainer ring surrounding each seat member to afford it circumferential support, said retainer ring having a lip portion which is spaced from and projects in front of the face mass, a bonnet closing the valve chamber, said bonnet having a bore in which the turned portion of the valve member is trunnioned, an assembly having a fusible portion interposed between the turned portion and bore, the temperature limitation of the fusible portions being the same as the resilient material forming the seat so that on disintegration of the seat the fusible portion will likewise have disintegrated allowing the valve member to move downstream and form a metal-to-metal contact with the retainer ring which in turn makes metal-to-metal contact with the end wall.

2. A spherical plug valve comprising a valve body having two axially aligned fluid passages forming inlet and outlet ports and an open-top valve chamber interposed between said passages, the walls defining said chamber including end walls surrounding said passages and a bottom wall having an aperture therein, a rotatable generally spherical valve member positioned in the valve chamber, said valve member having a passage which in the open position of the valve registers with the inlet and outlet ports to form the run of the valve and having a lower stem trunnioned in the aperture of the bottom wall, a fusible assembly interposed between the aperture and stem, the top of the valve member having a turned portion and a tongue which when the valve member is in the closed position is aligned with the aligned fluid passages, an operating stem extending through the opening of the chamber, the operating stem having a groove cooperating with the tongue of the valve member, annular seat members formed of resilient material positioned between the valve member and flat end walls of the valve chamber, each seat member having a mass forming a valve engaging surface contacting the spherical surface of the valve member, a bonnet having a bore closing the opening of the valve chamber, the turned portion of the valve member trunnioned in said bore, a fusible assembly interposed between the bonnet bore and the turned portion of the valve member, each fusible assembly formed of an inner and outer annular bearing ring and an annular ring of fusible material sandwiched therebetween, the bonnet having a second bore through which the stem extends, the tongue portion of the valve member located in the second bore and being smaller in length than the diameter of the second bore so that upon disintegration of the fusible material of the assemblies surrounding the bottom stem and the turned portion of the valve member and the disintegration of the seats, the valve member may, when in the closed position, move to the downstream side and retard flow through the valve, means attaching the bonnet to the body, means establishing a seal between the body and the bonnet and between the stem and the second bore.

3. A fire-safe spherical plug valve comprising a valve body having two axially aligned fluid passages forming inlet and outlet ports and an open-top valve chamber interposed between said passages, the walls defining said chamber including end walls surrounding said passages and a bottom wall having an aperture therein, a rotatable generally spherical valve member positioned in the valve chamber, said valve member having a passage which in the open position of the valve registers with the inlet and outlet ports to form the run of the valve and having a lower stem trunnioned in the aperture of the bottom wall, a fusible assembly interposed between the aperture and stem, the top of the valve member having a turned portion and a tongue which when the valve member is in the closed position is aligned with the aligned fluid passages, an operating stem extending through the opening of the chamber, the operating stem having a groove cooperating with the tongue of the valve member, annular seat members formed of resilient material positioned between the valve member and flat end walls of the valve chamber, each seat member having a mass forming a valve engaging surface contacting the spherical surface of the valve member, an annular metal retainer ring surrounding each seat member to afford it circumferential support, the retainer ring provided with a lip projecting in front of the valve engaging surface of the seat, a flat metal restraining washer between each seat and its end wall, the washer having a lip portion around its inner circumference, a bonnet having a bore closing the opening of the valve chamber, the turned portion of the valve member trunnioned in said bore, a fusible assembly interposed between the bonnet bore and the turned portion of the valve member, each fusible assembly formed of an inner and outer annular bearing ring and an annular ring of fusible material sandwiched therebetween, the bonnet having a second bore through which the stem extends, the tongue portion of the valve member located in the second bore and being smaller in length than the diameter of the second bore so that upon disintegration of the fusible material of the assemblies surrounding the bottom stem and the turned portion of the valve member and the disintegration of the seats, the valve member may, when in the closed position, move to the downstream side and retard flow through the valve, by contacting the metal retaining ring and restraining washer which are in contact with the end wall, means attaching the bonnet to the body, means establishing a seal between the body and the bonnet and between the stem and the second bore.

4. A spherical plug valve comprising a valve body having two axially aligned fluid passages forming inlet and outlet ports and an open-top valve chamber interposed between said passages, the walls defining said chamber including flat end walls surrounding said passages and a bottom wall having an aperture therein, a rotatable generally spherical valve member positioned in the valve chamber, said valve member having a passage which in the open position of the valve registers with the inlet and outlet ports to form the run of the valve and having a lower stem trunnioned in the aperture, a fusible assembly interposed between the aperture and lower stem, the top of the valve member having a turned portion, a separate operating stem extending through the opening of the chamber, the operating stem cooperating with the valve member, annular seat members formed of resilient material positioned between the valve member and flat end walls of the valve chamber, each seat member having a face mass forming with a valve engaging surface contacting the spherical surface of the valve member, an annular metal retainer ring surrounding each seat member to afford it circumferential support, said retainer ring having a lip portion, a bonnet closing the valve chamber, said bonnet having a bore in which the turned portion of the valve member is trunnioned, a fusible assembly comprised of an inner and outer annular bearing ring and an annular ring of fusible material sandwiched between, the temperature limitation of the fusible material of the annular ring being less than the resilient material forming the seat so that on disintegration of the seat the fusible material will likewise have disintegrated, the effective thickness of the fusible material being at least as great as the effective distance the face mass extends beyond the retainer ring thereby allowing the valve member to move downstream and form a metal-to-metal contact with the retainer ring with the retainer ring in metal-to-metal contact with the end wall and in contact with the charred remains of the resilient material.

5. A spherical plug valve comprising a valve body having two axially aligned fluid passages forming inlet and outlet ports and a valve chamber interposed between said passages, the walls defining said chamber including flat end walls surrounding said passages, a bottom wall having an aperture therein, and a top wall having an opening therethrough, a rotatable generally spherical valve member positioned in the valve chamber, said valve member having a passage which in the open position of the valve registers with the inlet and outlet ports to form the run of the valve and having a lower stem trunnioned in the aperture, a fusible assembly interposed between the aperture and the lower stem, the top of the valve member having a turned portion which is trunnioned in the opening in the top wall, a fusible assembly interposed between the opening and the turned portion, an operating stem in the top wall of the chamber, the operating stem cooperating with the valve member, annular seat members formed of resilient material positioned between the valve member and flat end walls of the valve chamber, each seat member having a face mass forming a valve engaging surface contacting the spherical surface of the valve member, an annular metal retainer ring surrounding each seat member to afford it circumferential support, each fusible assembly comprised of an inner and outer annular bearing ring and an annular ring of fusible material sandwiched between, the temperature limitation of the fusible material of the annular ring being less than the resilient material forming the seat so that on disintegration of the seat the fusible material will likewise have disintegrated, the effective thickness of the fusible material being at least as great as the effective distance the face mass extends beyond the retainer ring thereby allowing the valve member to move downstream and form a metal-to-metal contact with the retainer ring with the retainer ring in metal-to-metal contact with the end wall and in contact with the charred remains of the resilient material.

6. A fire-safe spherical plug valve comprising a valve body having two axially aligned fluid passages forming inlet and outlet ports and an open-top valve chamber interposed between said passages, the walls defining said chamber including flat end walls surrounding said passages, a rotatable generally spherical valve member positioned in the valve chamber, said valve member having a passage which in the open position of the valve registers with the inlet and outlet ports to form the run of the valve and having a lower stem trunnioned in the aperture, a separate operating stem extending through the opening of the chamber, the operating stem cooperating with the valve members, annular seat members formed of resilient material positioned between the valve member and flat end walls of the valve chamber, each seat member having a face mass forming a valve engaging surface contacting the spherical surface of the valve member, an annular metal retainer ring surrounding each seat member to afford it circumferential support, said retainer ring having a lip portion which is spaced from and projects in front of the face mass, a restraining washer between each seat and its end wall, each restraining washer having a lip portion about the inner periphery extending toward the valve member, a bonnet closing the valve chamber, said bonnet having a bore in which the operating stem is trunnioned, means provided so that upon disintegration of the resilient material forming the seat the valve member when in closed position can move downstream an amount sufficient to enable the valve member to make line metal-to-metal contact with the lip of the retaining ring and the lip of the restraining washer while at the same time the retaining ring and restraining washer are in metal-to-metal contact with the end wall of the valve chamber.

7. A plug valve comprising a valve body formed with a valve chamber and flow passages communicating with said chamber, valve means including stem means positioned for rotation in said chamber, seat means positioned within said chamber and in sealing engagement with said valve means and including non-fusible means normally spaced from said valve means, bearing means positioned within said chamber and retaining said stem means for support of said valve means against lateral movement, said bearing means including fusible means for allowing lateral movement of said valve means upon deterioration of said fusible means, whereby said valve means will be moved by line pressure to engage said seat means and effect a downstream seal.

8. A plug valve comprising a valve body formed with a valve chamber and flow passages communicating with said chamber, valve means including stem means positioned for rotation in said chamber, seat means positioned within said chamber and in sealing engagement with said valve means and including non-fusible means normally spaced from said valve means, bearing means positioned within said chamber and retaining said stem means for support of said valve means against lateral movement, said bearing means including fusible means for allowing lateral movement of said valve means upon deterioration of said fusible means, the thickness of said fusible means being greater than the spacing between said valve means and said non-fusible means, whereby, said valve means will be allowed to move by line pressure sufficiently to engage said seat means and effect a downstream seal.

9. A plug valve comprising a valve body formed with a valve chamber and flow passages communicating with said chamber, valve means including stem means positioned for rotation in said chamber, seat means positioned within said chamber and in sealing engagement with said valve means and including non-fusible means normally spaced from said valve means, said valve body having upper and lower bearing apertures for receiving said stem means, bearing means interposed between said stem means and said bearing apertures and retaining said valve means against lateral movement, said bearing means comprising a heat resistant means positioned in said bearing apertures and in engagement with said stem means and fusible means for supporting said heat resistant means, said fusible means being of greater thickness than the spacing between said valve means and said non-fusible means whereby, upon deterioration of said fusible means said valve means will be moved laterally by line pressure sufficiently to engage said seat means and effect a downstream seal.

10. A plug valve comprising a valve body formed with a valve chamber and flow passages communicating with said chamber, valve means including stem means positioned for rotation in said chamber, seat means positioned within said chamber and in sealing engagement with said valve means and including non-fusible means normally spaced from said valve means, said valve body having upper and lower bearing apertures for receiving said stem means, bearing means interposed between said stem means and said bearing apertures to retain said valve means against lateral movement, said bearing means comprising inner and outer heat resistant rings positioned in said bearing apertures, fusible means interposed between said inner and outer rings and being of greater thickness than the spacing between said valve means and said non-fusible means, whereby, upon deterioration of said fusible means said valve means will be moved laterally by a line pressure sufficiently to engage said seat means and effect a downstream seal.

11. A plug valve comprising a valve body formed with a valve chamber and flow passages communicating with said chamber, a rotatable valve member having stem means extending therefrom and a through passage formed therein and being positioned for rotation in said chamber, an annular seat member positioned about each of said flow passages, said seat member including a non-fusible support ring, resilient sealing means retained by said support ring and being in sealing engagement with said valve member, said support ring normally being spaced from said valve member, bearing means positioned within said chamber and retaining said stem means for support of said valve means against lateral movement, said bearing means including fusible means for allowing lateral movement of said valve means upon deterioration of said fusible means whereby, said valve means will be allowed to be moved by line pressure to engage said seat means and effect a downstream seal.

12. A plug valve comprising a valve body formed with a valve chamber and flow passages communicating with said chamber, a rotatable valve member having stem means extending therefrom and a through passage formed therein and being positioned for rotation in said chamber, an annular seat member positioned about each of said flow passages, said seat member including a non-fusible support ring, resilient sealing means retained by said support ring and being in sealing engagement with said valve member, said support ring normally being spaced from said valve member, bearing means positioned within said chamber and retaining said stem means for support of said valve means against lateral movement, said bearing means including fusible means of a greater thickness than the spacing between said valve member and said non-fusible ring for allowing sufficient lateral movement of said valve means upon deterioration of said fusible means whereby, said valve means will be allowed to be moved by line pressure to engage said seat means and effect a downstream seal.

13. A plug valve comprising a valve body formed with a valve chamber and flow passages communicating with said chamber, a rotatable valve member having stem means extending therefrom and a through passage formed therein and being positioned for rotation in said chamber, an annular seat member positioned about each of said flow passages, said seat member including a non-fusible support ring, fusible resilient sealing means retained by said support ring and being in sealing engagement with said valve member, said support ring normally being spaced from said valve member, bearing means positioned within said chamber and retaining said stem means for support of said valve means against lateral movement, said bearing means including fusible means of a greater thickness than the spacing between said valve member and said non-fusible ring for allowing sufficient lateral movement of said valve means upon deterioration of said fusible means and said fusible sealing means whereby, said valve means will be allowed to be moved by line pressure to engage said non-fusible support ring and effect a downstream seal.

References Cited in the file of this patent

UNITED STATES PATENTS

| | | |
|---|---|---|
| 2,929,606 | Kaiser | Mar. 22, 1960 |
| 2,942,840 | Clade | June 28, 1960 |
| 2,963,260 | Siravo | Dec. 6, 1960 |
| 2,986,374 | Rakus | May 30, 1961 |
| 3,067,977 | Anderson | Dec. 11, 1962 |
| 3,067,978 | Natho | Dec. 11, 1962 |